Oct. 25, 1932.                C. L. HILL                1,885,098
                         COMPASS CONTROL SYSTEM
                    Filed March 11, 1931    5 Sheets-Sheet 1

INVENTOR
Curtiss L. Hill.
BY M. H. Lane
ATTORNEY

Oct. 25, 1932.　　　　C. L. HILL　　　　1,885,098
COMPASS CONTROL SYSTEM
Filed March 11, 1931　　5 Sheets-Sheet 3

INVENTOR
Curtiss L. Hill
BY M. H. Lane
ATTORNEY

Oct. 25, 1932.    C. L. HILL    1,885,098
COMPASS CONTROL SYSTEM
Filed March 11, 1931    5 Sheets-Sheet 4

INVENTOR
Curtiss L. Hill
BY M. H. Lane
ATTORNEY

Patented Oct. 25, 1932

1,885,098

UNITED STATES PATENT OFFICE

CURTISS L. HILL, OF TACOMA, WASHINGTON, ASSIGNOR OF ONE-HALF TO R. CLAYTON McRAE, OF TACOMA, WASHINGTON

COMPASS CONTROL SYSTEM

Application filed March 11, 1931. Serial No. 521,771.

My invention relates to that class of inventions in which deviations of ships, airplanes and all dirigible bodies from a prescribed course will be substantially prevented, and the body may be steered, through the instrumentality of apparatus including a photoelectric tube or cell.

My invention is also useful in other relations, being applicable to any apparatus or instrument which is governed by the position of a controlling device, either with or without a driving motor and with or without a relay.

A feature of my invention is a timing device for periodically interrupting the electric current which supplies the rudder-operating motor while it is in action.

Another feature of my invention is the novel construction of the compass card herein described.

Still another feature is the casing mounted upon the compass and carrying a photoelectric element and suitable optical apparatus.

Specifically, my invention comprises a magnetic or any other form of compass, a photoelectric tube responsive to changes in the relative position of the compass card and its case, a sensitive relay governed by the tube and a motor controlled by a reversing switch for driving the steering wheel in either direction.

One object of my invention is to provide an apparatus that will quickly act upon the rudder of a ship or other body to bring it to the desired course, either when a change in its course is to be made or when the ship has swerved and is to be brought back.

To this end I make use of a single photoelectric tube energized by a beam of light. The compass card is in the path of this beam and passes it on to the tube when the light falls to one side of the north rose or marking of the compass card, but intercepts it the instant it falls to the other side of said marking. The tube acts instantaneously upon the relay, which quickly throws the switch and starts the motor, checking the ship when it swerves before it gains appreciable momentum, and reversing or prolonging the application of power upon the rudder in response to every external force acting upon the ship.

In my device there are no circuit-closers or other metal parts except the magnets mounted upon the compass card. The only new feature in the construction of the card is a light mirror or a slot on one side of its north marking that does not interfere with the balance of the card or the functions of the magnetic elements mounted thereon.

The general purpose of this device, is through the application of a photo-electric tube and associated apparatus to a magnetic or any other form of compass, to keep a ship or an airplane on any required course.

Such an apparatus provides a means of steering a ship which is vastly superior to hand steering, making possible considerable economies in large vessels through shorter distances traveled between ports, and eliminating the necessity of continuous attention to steering in work boats and small pleasure craft.

This device may be applied to any size or type of ship, having any type of steering apparatus.

My invention consists in the combination of elements and details of construction herein described and particularly pointed out in the accompanying claims.

Referring to the drawings.

Broadly speaking, the main elements of my invention when used for steering ships are: a mariner's or other compass A, having a small mirror mounted on the compass card; optical and photo-electric elements B mounted in a box carried by an adjustable light-box; a relay C controlled by the photo-electric element B; a reversing switch D operated by current from the relay; a motor E controlled by the switch; a timing mechanism F for periodically breaking the motor circuit; and steering mechanism G operated by the motor.

Figure 1:
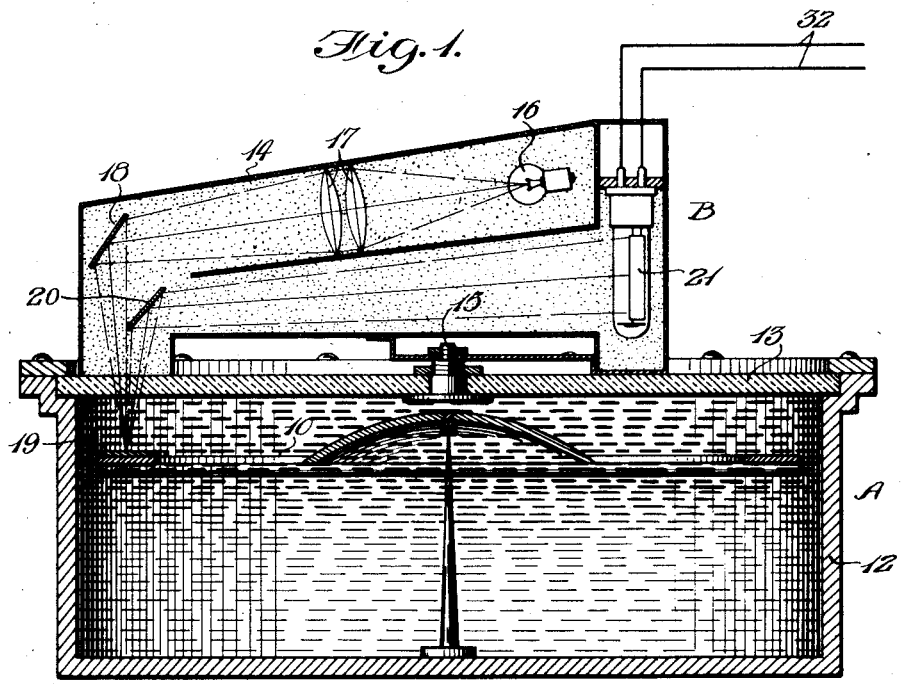
Fig. 1 is a section of a conventional form of magnetic compass with a photo-electric tube-and-light-box, together with a portion of the circuit leading from the tube.
Figure 2:
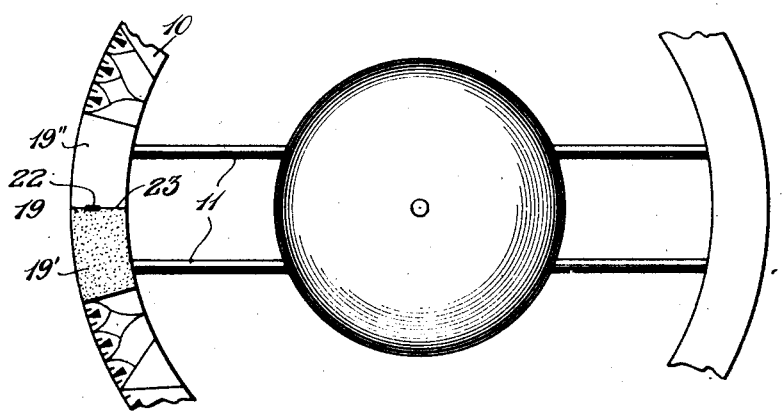
Fig. 2 is a plan view of a section of the compass card.

Referring particularly to Figs. 1 and 2, 10 is a movable compass card integral with which are permanent magnets 11 so arranged that the compass rose always points to the north. The compass case 12 is filled with a damping liquid, the cover 13 being of glass. The whole compass is swung in gimbals as usual.

Mounted on top of the compass case is a small light-and-tube-box 14 so arranged that it may be rotated at will about the vertical axis of the compass. Bearing for this box is provided by a stud 15 sealed in the center of the cover glass. In this box, which excludes extraneous light, is a small incandescent light 16 operated from any convenient source. In front of the light 16 is a lens system 17, adjusted to cast an image of the light filament or a beam of light through a slit in front of the lamp or light upon a deflecting mirror 18, and on to a small horizontal mirror 19 on the movable compass card. The whole light beam is, therefore, condensed to a small point of light at the reflecting surface of the horizontal mirror. Following further the light train, the beam is reflected upward from the horizontal mirror on the compass card through another deflecting mirror 20, thence to the cathode plate of a photo-electric tube 21, which, for example, may be assumed to be a type PJ23 tube, manufactured by the General Electric Company, or any standard tube obtainable in the market. A suitable tube is shown in the patent to Wein, No. 1,720,654, dated July 9, 1929.

Returning to the horizontal mirror on the compass card, this mirror covers, say, 20 degrees on either side of the north rose. The section of the mirror 19' to the west of north is painted dull black or otherwise made non-reflecting, while the section 19" to the east of north is a reflecting surface. It will be seen, then, assuming the compass to be properly mounted on a ship, that if the boat is headed magnet north and if the light box is revolved until the small image 22 of the light filament is just at the dividing ling 23 between the reflecting and non-reflecting surfaces of the horizontal mirror, the following action will take place. If the ship swings to the east, the light train will fall upon the reflecting surface of the mirror and light will be reflected to the photo-electric tube; if the ship swings to the west of north, the light train will fall upon the non-reflecting surface, being intercepted thereby, and consequently no light will be reflected to the photo-electric tube. If the image of the light is made small and the dividing line on the mirror is sharp, it will be seen then that, for a normal sized compass, the ship need only deviate from her course a fraction of a degree to change completely the degree of light on the photo-electric tube.

If some means is now provided whereby the condition of no light on the photo-electric tube will, through appropriate apparatus, swing the rudder to turn the ship to starboard and the condition of full illumination on the tube will turn the ship to port, the ship will follow a slightly weaving course, approaching, as the apparatus is more finely developed, a straight line directly on the magnetic course set. By adjusting the light box to any desired compass point, any course can be steered.

Figure 3:
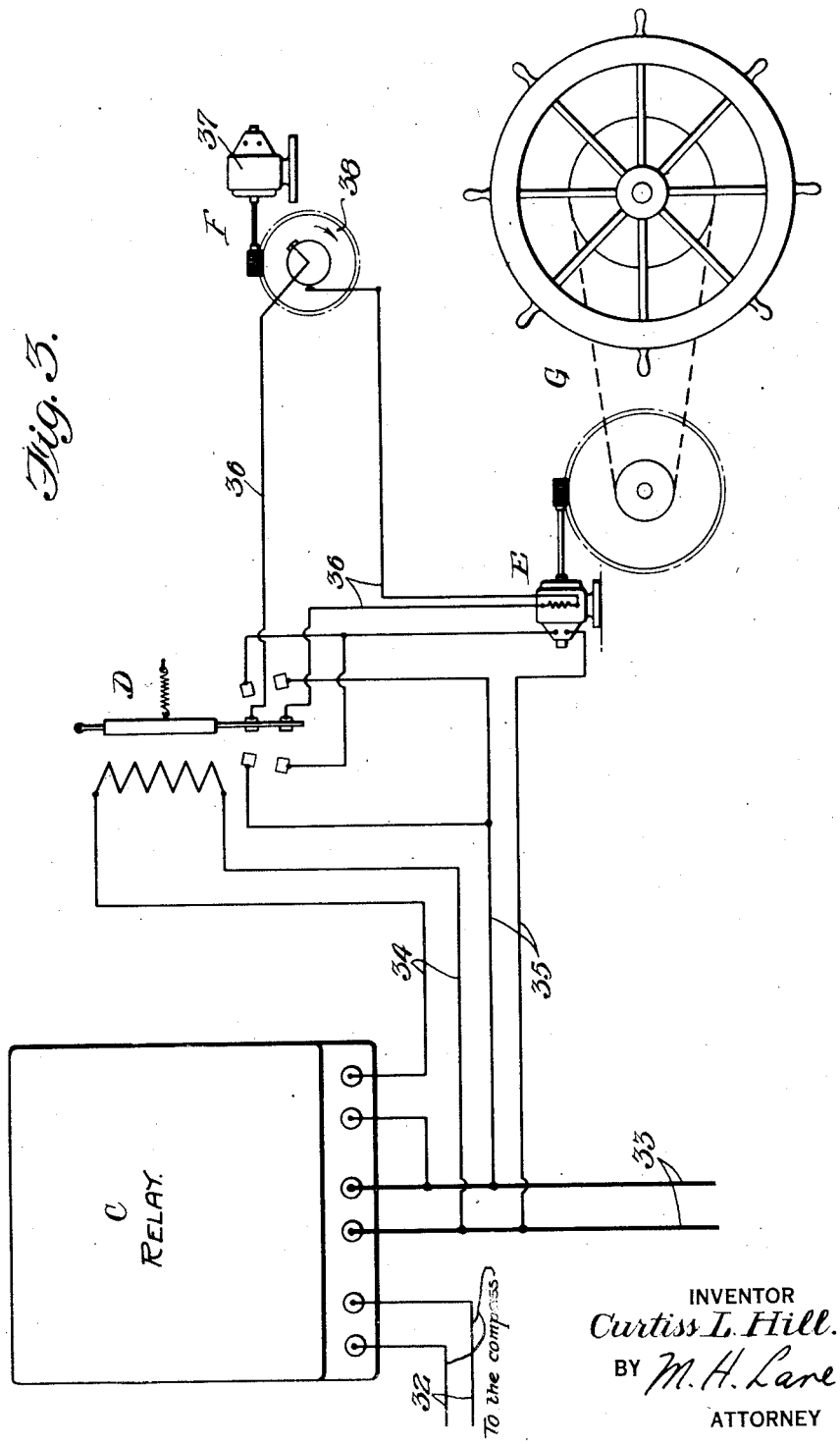
Fig. 3 is a diagrammatic view of a relay unit with its controlling circuit leading from the tube of Fig. 1, and a power circuit and parts actuated thereby.

In Fig. 3 are shown parts of the apparatus designed to accomplish the necessary steering action referred to in the previous paragraph. C is the relay portion proper of a standard photo-electric relay unit similar to that manufactured by the General Electric Company and known as type CR7505—Y1 or A2. In my device the tube 21 is the photo-electric tube corresponding to the photo-electric tube of the General Electric unit that is mounted in a small separate holder. The pliatron tube and other parts are mounted inside a covered box or casing. These relays, while not to be construed as the only type to come under the scope of this disclosure, perform the function of amplifying the minute current generated by the photo-electric tube to a magnitude sufficient for operating a double pole double throw reversing switch D. Other types of relays such as those using grid glow tubes or those employing tubes of the "photolytic" type will perform the work equally well. A somewhat similar relay is shown diagrammatically in the patent to Snook, No. 1,565,596, dated December 15, 1925.

As will be seen, the reversing switch controls the small steering motor E connected to the steering mechanism G of the ship. The functions of the photo-electric relay unit, reversing switch and steering motor are then as follows: If the ship heads to the right of its course, light will fall upon the photo-electric tube, the relay unit will cause the reversing switch to be pulled to the closed or released position, depending upon the internal connections of the relay, which in turn will operate the steering motor to turn the steering wheel to the left, thus bringing the ship back on the course. If the ship heads to the left, the reverse action will take place.

Fig. 3 also shows a small timing device F so designed that the steering motor circuit will be closed only at definite controllable periods and for definite durations. This device prevents the continuous operation of the steering motor. The steering action then becomes more of a correction at definite intervals, which may be controlled at will. The connection of the steering motor to the steering wheel is made through a quick release mechanism giving instant release in cases of emergency.

Figure 4:
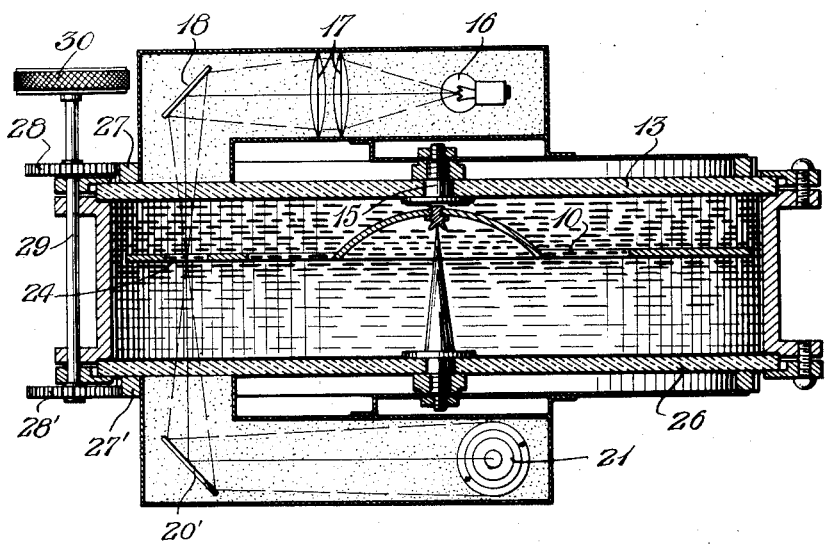
Fig. 4 is a view similar to Fig. 1, showing a modification.
Figure 5:
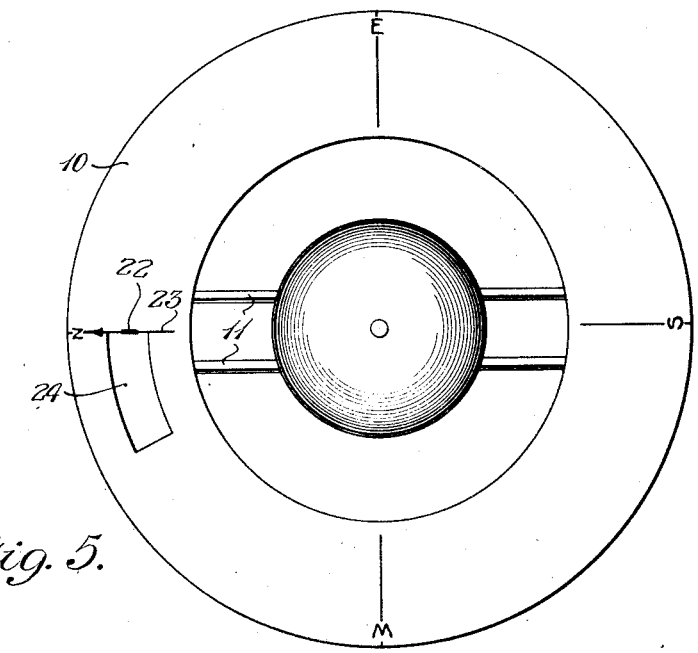
Fig. 5 shows a modification of the card illustrated in Fig. 1.

Figs. 4 and 5 show a modification of the compass system just described. In this arrangement the mirror on the compass card is replaced by a slot 24 in the card. If the light box containing the lens system and mirror corresponding to those in Fig. 1 is mounted on top of the compass and the photo-electric tube and necessary mirror 20' are on the bottom, the final action on the tube will be identical with that previously described. It is necessary that the compass case have a glass bottom 26. Also, in order that the light and photo tube remain always in the same relative position, these two assemblies are each mounted on ring gears 27, 27' concentric with the center bearings, which are meshed with two adjusting gears 28, 28' mounted on one shaft 29. By turning the knurled adjusting nut 30, the light and photo tube assemblies revolve in proper relation to each other. The remaining portions of the apparatus are identical with those shown in Fig. 3 and perform the same functions.

Figure 6:
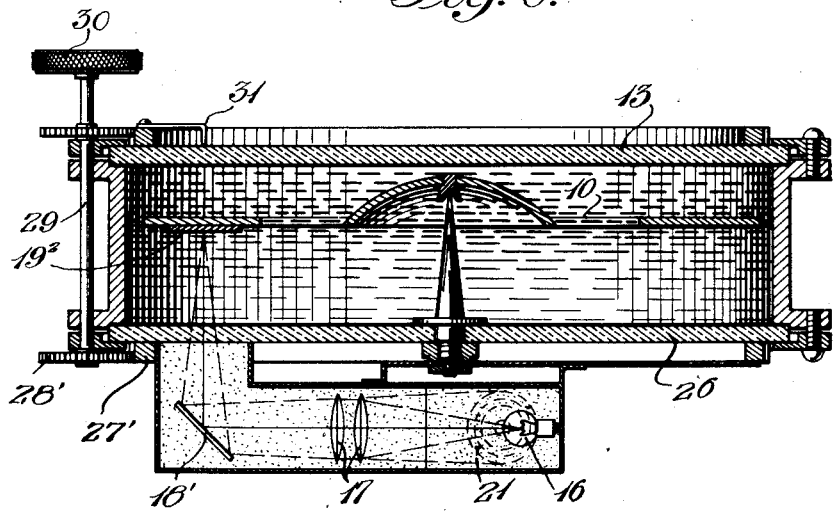
Fig. 6 is a vertical section, and Fig. 7 a bottom plan view, of another modification of the parts shown in Fig. 1.
Figure 7:
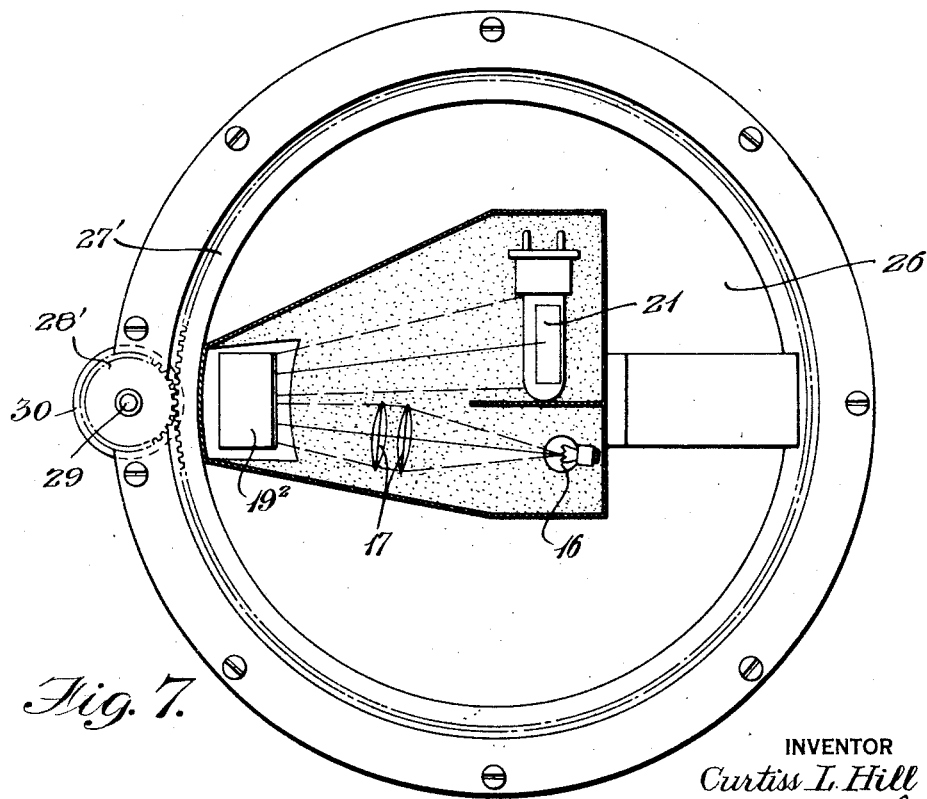

Still a further form is shown in Figs. 6 and 7. In this arrangement both the light and photo tube assemblies are on the bottom of the compass, which has a glass bottom. The horizontal mirror 19² on the compass card having one-half of its surface made non-reflecting and described in connection with Figs. 1 and 2, is in this case on the bottom of the compass card. The light and photo tube are horizontally disposed in such a manner that one deflecting mirror 18' takes the place of the two previously shown. The light box assembly is, as in Figs. 4 and 5, mounted on a ring gear operated from the top by means of the knurled adjusting nut. Another ring gear carrying an index 31 is mounted on the top of the compass to indicate the position of the light beam so that the compass may be properly set. The index always retains the same relative position in regard to the light beam.

This arrangement has the advantage of not interfering with the view of the compass and consequently does not require any other compass equipment on the ship. It is out of sight and not readily tampered with. Also the weight is properly disposed, it not being necessary to provide additional counterweighting to balance the compass.

Many other arrangements suggest themselves, but each is based on the fundamental principle of allowing light to fall on the photo tube by passing through a slot when the card is moved in one direction, or being reflected by a mirror or intercepting the passage of the light to the photo tube by means of the opaque card itself or a non-reflecting surface thereon when the card is moved in the opposite direction.

Figure 8:
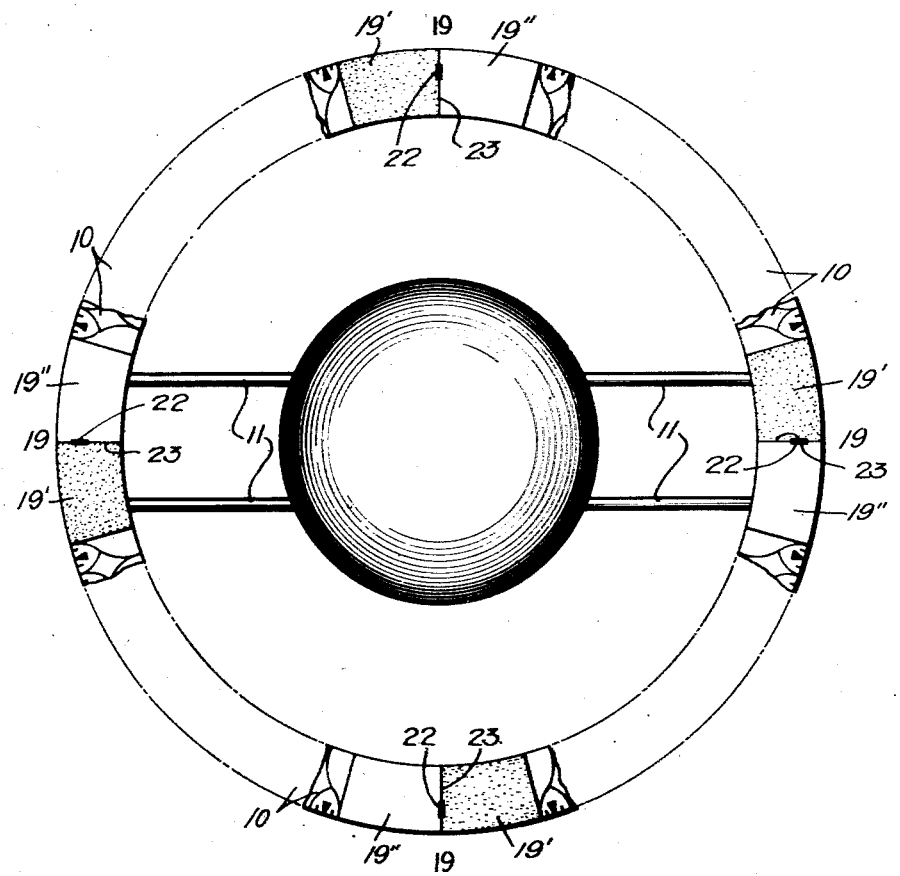
Fig. 8 is a plan view of the complete compass cord showing a mirror on each quadrant.

In actual practice four mirrors would be mounted on the compass card so that it would never be necessary to move the light box assembly more than 45 degrees to reach any required course (see Fig. 8). In each case where deflecting mirrors are referred to, reflecting prisms could be used to advantage on account of better reflecting qualities.

The connections from the light and photo tube are made through very flexible wires so that no interference with the free movement of the compass case in its gimbals will result.

In practical operation it is only necessary for the ship to be put on the proper course by hand and the light box rotated to bring the light beam on the dividing line of the nearest mirror. The ship will then remain on the particular magnetic course selected.

The wiring of my device is as follows: 32 is the circuit conducting the weak current from the photo-electric tube to the relay, 33 is the power circuit leading to the switch and motor through shunt circuits 34 and 35. The shunt 34 connects with relay C so as to be controlled thereby. The motor-controlling or field circuit 36 is periodically interrupted by a timing device F, comprising a small motor 37 or any suitable driving mechanism geared or otherwise connected to a timing segment 38.

Among the advantages of my device the following are of great practical value:

There is absolutely no interference with the free action of the compass card, this feature alone making this device vastly superior to any system using contacts, auxiliary needles, etc.

The price at which this device can be profitably sold is only a fraction of that of a gyroscopic steering equipment. It is not a complicated device and with reasonable care should require but a small expenditure for maintenance.

I do not limit myself to any particular form of photo-electric element. The claims are intended to cover selenium cells as well as every device for translating light waves into electric current; the cells may be sensitive to other forms of radiant energy. Likewise the term "navigating device" is not to be understood as limited to devices to be used on ships or boats, but it covers devices to be used to control inanimate bodies on land, or in the sea or air. Also the compass card is not necessarily flat, and where "the plane of the card" is referred to in the claims, the plane may be curved as in the case of a conical or dome-shaped card. The current in circuit 33 may be A. C. or D. C.

A very practical and useful alternate arrangement to which this system may be applied is as follows: Suppose that the motor driving the steering wheel of the ship be replaced by a small reversible motor, this motor being geared to a disc in a horizontal plane beneath the compass. If the shaft of the disc is connected to the light and tube box through proper universal joints so that the free movement of the compass in its gimbals will not be interfered with, this disc will then follow the compass card, having a slight oscillating motion as the light beam first falls on the non-reflecting surface and then on the reflecting surface. This oscillating motion will be reasonably constant and can be compensated for. This disc when graduated in degrees as in the usual compass card then becomes an auxiliary compass card, which follows faithfully the master card and has as much directive power as desired without in any manner affecting the master compass. From this auxiliary card may be operated repeater compasses, which may in turn be used for any desired purpose aboard ship, such as to orientate a pelorous, a radio finder, or even to steer a ship, as hereinbefore described. In this arrangement the light and tube box is released so as to rotate freely on the compass case. The two relatively moving parts of claim 3, for instance, then become the light and tube box with the disc connected thereto, and the compass card.

I claim:

1. A compass card having a mirror surface substantially in the plane of its upper surface and occupying an area immediately to one side of and bounded on one side by a portion of one of its diameters.

2. A compass having a casing, a compass card carrying a magnetic element, a ring revolubly mounted on the compass casing concentric with the pivot axis of the magnetic element, and light-deflecting means fixed to said ring for directing light upon the compass card, the card structure on one side of a prescribed point thereon intercepting the light, and light falling on the other side of said point not being intercepted.

3. A compass having a compass card, light-sensitive means and light-generating means mounted, one above and one below the compass card, in combination with light-focussing and light-reflecting means mounted on the same side as the light-generating means and in substantially horizontal alinement therewith.

4. The combination with a navigating device and a single light-sensitive element, of means for energizing said element when the position of the device is changed in a manner such that a given point thereon lies to one side of a relatively fixed line, and for de-energizing said element when its position is changed so that said point lies to the other side of said line, a device biased to one position, and one-way induction means for moving said last-named device from said position when said element is energized and for releasing it when the element is de-energized.

5. A balanced compass card having a central portion provided with a pivot member, said card having a surface on one side of and bounded by one of its diameters constructed of a material that intercepts light rays while light rays falling on the other side of said diameter within an area directly adjacent said portion and bounded on one side by said diameter pass from a point outside said plane on to another point outside the plane according to the direction of movement of the card and beam relatively to each other around the pivot of the card, the material of the card lying substantially in a single plane, each point in the periphery of the card being substantially the same distance from the pivot center as the point directly opposite so as to balance the card.

6. The combination with a compass having a compass card provided with a magnetic element, a single element sensitive to radiant energy and a source of radiant energy which is stationary relative to the said element for irradiating the element when the position of the compass casing is changed in a manner such that a given point thereon lies to one side of a relatively fixed straight, thin line on the card, the rays from said source being cut off from said element by the compass card when the position of the casing is changed such that said point lies to the other side of said line, whereby parts controlled by the compass through said element will be immediately reversed without any dwell due to neutral position, a device controlled by said element, and means for operating said last-named device in one direction when the said element is irradiated, and for reversing it when the element is not irradiated.

7. A navigating device comprising a compass, a circuit including a single element for determining the amount of current in said circuit, said element being dependent upon radiant energy for its operation, a source of radiant energy which is stationary relative to the said element for irradiating the element only when the compass deviates to one side of a predetermined orientation, and said source being cut off from said element when the compass deviates to the other side, whereby parts controlled by the compass through said element will be immediately operated in one direction or the other without any dwell due to neutral position, a device controlled by said element, and means for operating said last-named device in one direction when the said element is irradiated, and for reversing it when the element is not irradiated.

8. A device of the character described comprising a compass casing, a single element sensitive to radiant energy, means for projecting a beam of radiant energy upon said element, said sensitive element and said projecting means being relatively fixed, a compass card constructed to operate only when said casing and card are to one side of a predetermined relative position for cutting off said beam from the sensitive element, whereby parts controlled by the compass through said element will be imediately operated in one direction or the other without any dwell due to neutral position, a device controlled by said element, and means for operating said last-named device in one direction when said element is irradiated, and in the opposite direction when it is not irradiated.

9. The combination of a compass having a compass card, a single element sensitive to radiant energy mounted on the compass, means mounted on the compass for projecting a beam of radiant energy, means for directing said beam to the compass card and thence to said element when the beam falls to one side of a prescribed point on the card, said beam being intercepted by the card when it falls to the other side of said point, whereby parts controlled by the compass through said element will be immediately operated in one direction or the other without any dwell due to neutral position, a device controlled by said element, and means for operating said last-named device in one direction when said element is irradiated, and in the opposite direction when it is not irradiated.

10. A device of the character described comprising an element consisting of a single source of electric energy sensitive to radiant energy, a device controlled thereby, a compass casing, said element being stationary relative to said casing, means mounted upon said casing for projecting a beam of radiant energy, a compass card constructed and arranged to cut off said beam only when the compass deviates to one side of a predetermined direction, whereby parts controlled by the compass through said element will be immediately operated in one direction or the other without any dwell due to neutral position, and means for operating said controlled device in one direction when said element is energized and in the opposite direction when it is not energized.

11. The combination set forth in claim 7, in which radiant energy proceeding from the source is in the form of a narrow beam or ribbon.

12. The combination set forth in claim 8, in which the beam is in the form of a narrow ribbon and the projecting means includes an optical device for focusing the beam in the plane of the compass card.

13. The combination set forth in claim 8, in which the projecting means and the sensitive element are mounted on the compass casing.

14. A navigating device comprising a compass, a circuit including a single element for determining the amount of current in said circuit, said element being dependent upon radiant energy for its operation, a source of radiant energy which is stationary relative to the said element for irradiating the element only when the compass deviates to one side of a predetermined orientation, and said source being cut off from said element when the compass deviates to the other side, whereby parts controlled by the compass through said element will be immediately operated in one direction or the other without any dwell due to neutral position, a device controlled by said element, and means for causing an uninterrupted movement of said last-named device in one direction when the said element is irradiated, and an uninterrupted movement in the other direction when the element is not irradiated.

In testimony whereof I affix my signature.

CURTISS L. HILL.